US009311062B2

(12) United States Patent
Braun et al.

(10) Patent No.: US 9,311,062 B2
(45) Date of Patent: Apr. 12, 2016

(54) CONSOLIDATING AND REUSING PORTAL INFORMATION (71) Applicant: INTERNATIONAL BUSINESS MACHINES CORPORATION, Armonk, NY (US)

(72) Inventors: Stanley J. Braun, Tucson, AZ (US); Donald P. Defelice, Poughkeepsie, NY (US); Mark R. Ernstberger, Rochester, NY (US); Susan A. Hearn, Toronto (CA); Linwood E. Loving, Mechanicsville, VA (US); Martin G. McLaughlin, Glasgow (GB); Lindsey M. Mewse, Berks (GB); Donald P. Muller, Highland, NY (US); James S. K. Young, Oshawa (CA)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/068,752

(22) Filed: Oct. 31, 2013

(65) Prior Publication Data

US 2015/0121335 A1 Apr. 30, 2015

(51) Int. Cl.
*G06F 9/44* (2006.01)

(52) U.S. Cl.
CPC ... *G06F 8/36* (2013.01); *G06F 8/38* (2013.01)

(58) Field of Classification Search
None
See application file for complete search history.

(56) References Cited

U.S. PATENT DOCUMENTS

| 8,056,014 | B2 | 11/2011 | Brockway et al. | |
|---|---|---|---|---|
| 2002/0087947 | A1* | 7/2002 | Kwon et al. | 717/120 |
| 2003/0046282 | A1* | 3/2003 | Carlson et al. | 707/6 |
| 2003/0167315 | A1* | 9/2003 | Chowdhry et al. | 709/218 |
| 2004/0103389 | A1* | 5/2004 | Song et al. | 717/107 |
| 2004/0225995 | A1* | 11/2004 | Marvin et al. | 717/100 |
| 2005/0182744 | A1* | 8/2005 | Kawabata | G06F 8/36 707/999.001 |
| 2006/0165123 | A1* | 7/2006 | Jerrard-Dunne et al. | 370/468 |
| 2007/0150855 | A1* | 6/2007 | Jeong | 717/106 |
| 2007/0157082 | A1 | 7/2007 | Green et al. | |
| 2008/0072100 | A1* | 3/2008 | Okada | 714/28 |
| 2009/0259987 | A1* | 10/2009 | Bergman et al. | 717/107 |
| 2010/0218124 | A1* | 8/2010 | Aryanto et al. | 715/762 |
| 2010/0333069 | A1* | 12/2010 | Chandra et al. | 717/126 |
| 2011/0093800 | A1 | 4/2011 | Gottwald et al. | |
| 2011/0099470 | A1* | 4/2011 | Ananthanarayanan et al. | 715/255 |

(Continued)

OTHER PUBLICATIONS

Caldiera et al., "Identifying and Qualifying Reusable Software Components", 1991, IEEE.*

(Continued)

*Primary Examiner* — Jue Louie
(74) *Attorney, Agent, or Firm* — Matthew Chung; Andrew M. Calderon; Roberts, Mlotkowski, Safran & Cole PC (57) ABSTRACT

An approach for consolidating and reusing portal information within different web applications. The approach includes a method that includes retrieving, by at least one computing device, code from an application. The method includes deconstructing, by the at least one computing device, the code into code fragments. The method includes validating, by the at least one computing device, each of the code fragments. The method includes matching, by the at least one computing device, each of the code fragments with server-side components. The method includes generating, by the at least one computing device, a portlet based on the matching.

19 Claims, 4 Drawing Sheets

(56) References Cited

U.S. PATENT DOCUMENTS

| | | | | |
|---|---|---|---|---|
| 2011/0107243 | A1* | 5/2011 | Jain | G06F 17/30997 715/762 |
| 2011/0246968 | A1* | 10/2011 | Zhang | G06F 8/751 717/125 |
| 2013/0041900 | A1* | 2/2013 | McCoy et al. | 707/737 |
| 2014/0040862 | A1* | 2/2014 | Webster | G06F 8/61 717/121 |

OTHER PUBLICATIONS

J. Linwood et al., "Exposing an Existing Application as a Portlet", 2004, Building Portals with Java Portal API, Chapter 13.*

Belles et al. "An Automatic Approach to Displaying Web Applications as Portlets", 2006, ICDCIT 2006.*

Selim et al., "A Test-Driven Approach for Extracting Libraries of Reusable Components from Existing Applications", 2011, XP 2011.*

Goh et al., "Building a Portal for reusable software components with Microsoft SharePoint Server: design, implementation, and experiences in Singapore," MCB UP Limited, V. 37, No. 3, 2003, pp. 158-167.

Paul et al., "A Framework for Source Code Search Using Program Patterns," Software System Research Laboratory Dept. of Electrical Engineering and Computer Science University of Michigan, 1994, 14 pages.

Kontogiannis et al., "Pattern Matching for Clone and Concept Detection," Kluwer Academic Publishers, 1996, pp. 77-108.

* cited by examiner

CONSOLIDATING AND REUSING PORTAL INFORMATION

FIELD OF THE INVENTION

The present invention generally relates to a system and method of creating a library of reusable components for web applications, and more particularly, to a method and system for consolidating and reusing portal information within different web applications.

BACKGROUND

An organization (e.g., government, medical, retail, manufacturing, etc.) may consist of multiple business areas, such as accounting, marketing, finance, sales, operations, etc. Each business area within the organization may create a web application (e.g., a web page, web portal, etc.) that is used by internal and external customers of that particular business area within the organization. For example, an accounting department of an organization may create one web application and the marketing department of the same organization may create another web application. A web application may include different features, such as portals, that are associated with different types of code, such as hypertext markup language (HTML), Javascript, and/or other types of code.

As each business area may build their own web application, an organization can have different or varied portal solutions implemented and managed by individual project teams or business areas. Also, many portals can remain in place while new portals are developed which increases the number of disparate portals and infrastructure in the environment and results in a large number of portals that require excessive on-going maintenance and support. Thus, even though each portal instance can have some degree of commonality with other portal instances, over time it becomes increasingly difficult to justify the on-going maintenance and management of the disparate portals and infrastructure environments as new portals continue to be developed in parallel to the existing legacy portals.

SUMMARY

In a first aspect of the invention, a method includes retrieving, by at least one computing device, code from an application. The method further includes deconstructing, by the at least one computing device, the code into code fragments. The method further includes validating, by the at least one computing device, each of the code fragments. The method further includes matching, by the at least one computing device, each of the code fragments with server-side components. The method further includes generating, by the at least one computing device, a portlet based on the matching.

In another aspect of the invention, there is a computer program product for generating portlets. The computer program product includes a computer readable storage medium having program code embodied in the storage medium. The program code is readable/executable by a computing device to receive code. The computer program product includes deconstructing the code into code fragments. The computer program product includes validating the code fragments to determine that the code fragments can function alone. The computer program product includes matching each of the code fragments with server-side functions. The matching includes analyzing at least one of: a key word, a tag, and metadata. The computer program product includes generating a portlet based on the matching.

In a further aspect of the invention, a system includes a CPU, a computer readable memory and a computer readable storage medium. Additionally, the system includes one or more program instructions. Program instructions are operable to retrieve code from a web application. Program instructions deconstruct the code into code fragments. Each of the code fragments is associated with at least one of: hypertext markup language (HTML) and JavaScript. Program instructions validate that each of the code fragments can function without requiring functionality of other code fragments. Program instructions match each of the code fragments with server-side components. The server-side components are at least one of: common matched components, transitioned components, and unmatched components. Program instructions discard the code fragments associated with stored portlets. Program instructions store the code fragments that are not associated with the stored portlets. Program instructions generate a portlet and use the portlet in another web application. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to a system and method of creating a library of reusable components for web applications, and more particularly, to a method and system for consolidating and reusing portal information within different web applications. More specifically, the present invention provides one or more engines that can analyze existing portal code for potential building block components which may be harvested into a library of common functions and having the capability for potential re-use by new or existing web applications. In this way, the present invention consolidates portals and simplifies redundant portlets/code to a common, reusable base set that can be leveraged by multiple web applications and portals. As a result, the systems and methods of the present invention reduce the time required to create/modify web content and automate the creation of new software components. This, in turn, instills quality, repeatability and acceleration of the development and deployment process for: (i) creating new portal web content; (ii) augmenting existing portal content; and (iii) the transition and consolidation of web content. In this way, the present invention can reduce the development effort for quicker time to market, improve operating efficiencies, and also remove redundant costs.

In specific embodiments, the systems and methods of the present invention extract and isolate components from portal code associated with a user interface (UI) layer of one or more web applications. The isolated components are self contained modules that perform a particular function which are made available to be combined with other reusable components. More specifically, the present invention uses a server-side device to extract portal code in the UI layer which is broken into code fragments that can be isolated or combined with other code fragments. The code fragments can be associated with HTML, Javascript functions, server-side source, metadata, tags, keywords, etc. With the code fragments, the server-side device can: (i) match UI function calls via attributes in the HTML and Javascript function to their corresponding server-side component; (ii) identify and extract functions from the corresponding server-side component; (iii) insert the function as another code fragment in a common code repository; and (iv) validate that the code fragment can function by itself. Furthermore, a pattern matching engine, associated with the server-side device, determines whether code fragments coming from the UI layer and the server-side have recognizable or reusable common code patterns by analyzing common key words, meta-data, etc. As a result, a system and process of extraction, matching, and validating allows for the code fragments to be combined into a new portlet by using common code patterns that have been classified, flagged, and/or tagged.

In further embodiments, the server side device may use a portal auto-harvester to analyze the existing portal code from a web application, determine potential building block components for other web applications, and harvest components into a library of common functions and capabilities for use by other web applications. As a result, and advantageously, the invention will reduce costs and improve efficiencies by reducing the number of redundant components which need to be maintained. This is done by consolidating and reusing portal code to reduce the number of portals in the enterprise thereby reducing excessive overhead of ongoing maintenance and support costs. This allows for the elimination of storing duplicate components that have the same or similar functions. Further, the invention reduces the number of web components associated with a particular organization, and, as such, reduces the overhead expense of maintenance and support costs to maintain the web components. Also, the present invention reduces the time to create building blocks/applets and thus increases the speed of creating a new portal web content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
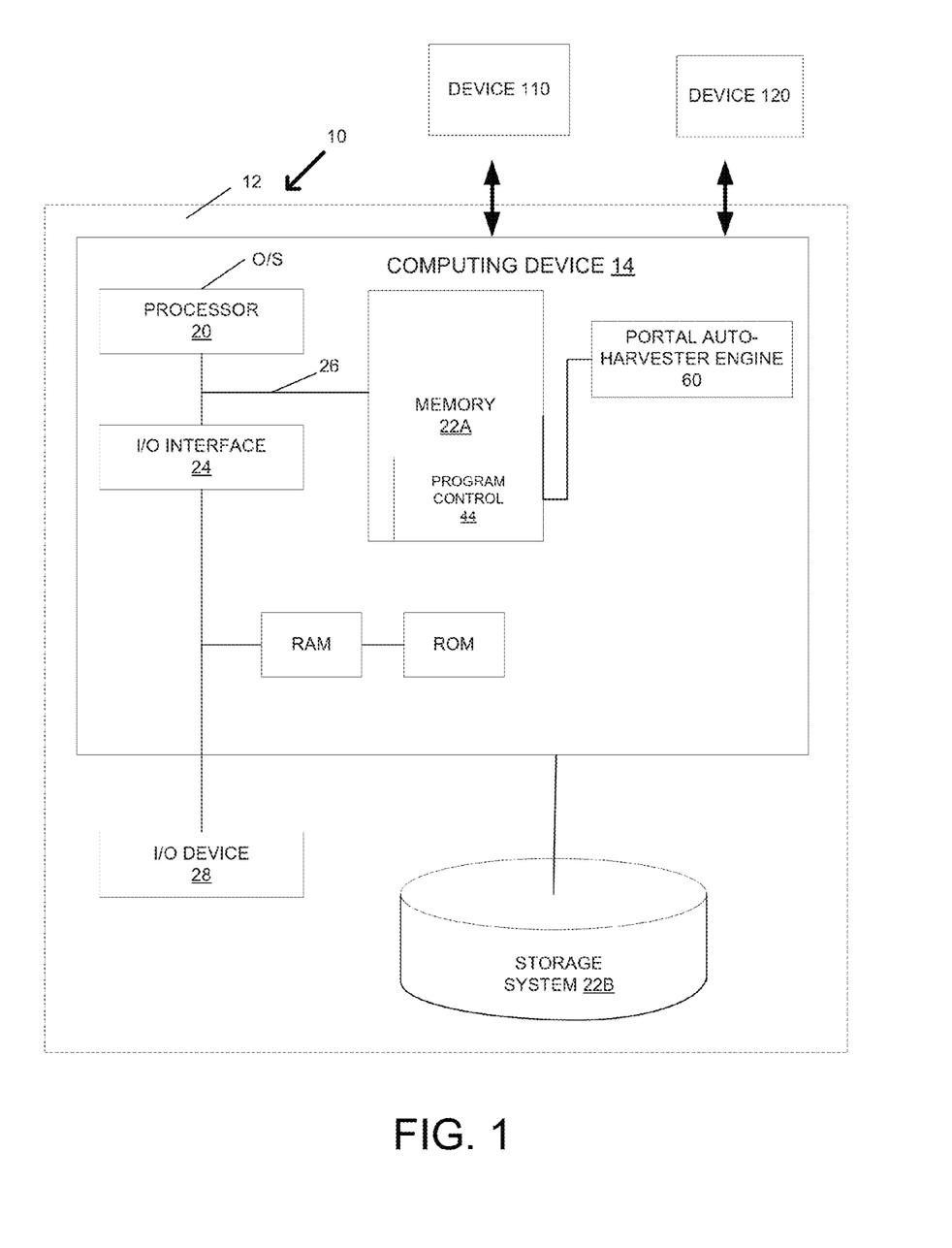
FIG. 1 is an illustrative environment for implementing the steps in accordance with aspects of the invention.

FIG. 1 shows an illustrative environment 10 for managing the processes in accordance with the invention. To this extent, environment 10 includes a server 12 or other computing system that can perform the processes described herein, device 110, and device 120. Devices 110 and 120 can be any computing device capable of being used to design and implement web applications. Also, in particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (0/S).

The computing device 14 is in communication with external I/0 device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/0 device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a portal auto-harvester engine 60, e.g., the processes described herein. Portal auto-harvester engine 60 can be implemented as one or more program code in program control 44 stored in memory 22A as separate or combined modules. Additionally, portal auto-harvester engine 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Portal auto-harvester engine 60 may receive code and/or other information from one or more web applications, analyze the code and/or the other information, and create components that can be used within other web applications. In embodiments, portal auto-harvester engine 60 may receive code and/or other information from a web application stored by device 110. Device 110 may be any type of device (e.g., computer, laptop, smart-phone, etc.) that can communicate via wire or wireless mechanism with portal auto-harvester engine 60.

In more specific embodiments, portal auto-harvester engine 60 can be started by selecting a web portal. The portal auto-harvester engine 60 will automatically analyze the portal code and create a list of possible functional components associated with the web portal. The portal auto-harvester engine 60 will search a web portal for building components by looking for tags, key words and certain common functions to isolate functional blocks. Accordingly, the portal auto-harvester engine 60 can run/test the isolated functional blocks. In embodiments, this may require the execution of code that has been designed to encapsulate the functional block which can then call and pass any required values. Upon completion of a valid run/test, the functional block can then be promoted as a component and stored in a common library, e.g., storage system 22B. The result of this process will then allow the user to view and run portions of the portal that have been isolated by intelligently passing in values to determine the viability of a functional block to work stand-alone or allow the user to combine several blocks to work as a larger software component.

In embodiments, a web application can be any application provided via an Intranet or that is associated with the use of the World Wide Web. By way of an illustrative, non-limiting example, a web application can be a web page which is a document written in mark-up language (e.g., HTML, extensible markup language (XML), etc.) that is transmitted across the World Wide Web. The web page may have links created from hypertext that can be used to navigate to other web pages. By way of another example, a web application can be a web portal that brings information together from different sources that are associated with different portlets. In embodiments, a portlet can be associated with different portions of the web portal and used as a user interface component that is associated with different applications (e.g., email, discussion forums, security, etc.).

In embodiments, portal auto-harvester engine 60 can automatically select a particular web application after a period of time (e.g., every 20 seconds, every five minutes, once every 24 hours, etc.). Upon the selection of a web application, portal auto-harvester engine 60 may retrieve code and/or other information from the web application. In alternative embodiments, portal auto-harvester engine 60 may send a request for code and/or the other information from the web application.

In embodiments, portal auto-harvester engine 60 may determine which web application to contact via information stored by portal auto-harvester engine 60 and the web application. For example, portal auto-harvester engine 60 can store uniform resource locator (URL) information for different web applications and/or each web application may store code that permits the web application to send code to portal auto-harvester engine 60. In embodiments, portal auto-harvester engine 60 may receive code by initiating a function call that requests code based on tags (e.g., opening tag, ending tag, etc.), keywords (text within the web application used to connect to the web application), and/or functions associated with the web application.

Regardless of the process of obtaining the code from the web application, the code and/or the other information may be associated with HTML, Javascript, and/or other types of code used to create different components (e.g., buttons, graphics, charts, etc.) that have different functions (e.g., login function, retrieve information function, calculate function, etc.) associated with the web application. In embodiments, there may be additional code, received from a web application, which can be used by portal auto-harvester engine 60 to find corresponding source code from the server side. In embodiments, source code can be HTML code that includes metadata (associated with scripts, style sheets regarding the web application itself or other web applications), document type (doctype) that identifies the version of the markup language, and/or other types of source code, e.g., extensible HTML (XHTML), JavaServer Pages Standard Tag Library (JSTL), etc. In embodiments, doctype can be: (i) HTML strict which allows the inclusion of structural and semantic markup, but does not allow presentational or deprecated elements such as font and/or framesets; (ii) HTML 4.01 transitional which allows the use of structural and semantic markup as well as presentational elements (such as font), which are deprecated in strict; and/or (iii) other doctypes such as XHTML 1.0, XHTML 1.1, HTML 2.0, etc.

Once portal auto-harvester engine 60 has received the code, portal auto-harvester engine 60 can execute code associated with the extracted component to determine whether the extracted component can function by itself. Portal auto-harvester engine 60 can run the portions of the portal that have been isolated by passing in values to determine the viability of a functional block (i.e., the code fragment received from the web application) to work stand-alone or to allow the user to combine several functional blocks to work as a larger functional component. By way of example, portal auto-harvester engine 60 can use one or more dummy variables to determine that the output of the extracted component is valid.

Furthermore, once portal auto-harvester engine 60 has determined that the extracted component can function by itself, portal auto-harvester engine 60 determines whether the extracted component is associated with common code patterns by using a pattern matching process. In embodiments, the pattern matching process ensures that code fragments that are matched with a particular function are not used to create portlets that already exist. For example, if a code fragment is associated with a login function and it is determined that a portlet that is used for a login function exists, then a duplicate portlet will not be created. Thus, the code fragment will not be stored or used to generate a portlet. However, if the pattern matching process determines that there is no stored function that performs the function associated with the code fragment, then the code fragment will be processed further.

Accordingly, once server-side code is associated with the code fragment for which a duplicate does not already exist, a portlet component may be generated by portal auto-harvester engine 60 by determining a match between stored code and the code extracted from the web application. In embodiments, the portlet component can be associated with Javascript, HTML, and/or other types of code.

The portlet component may then be stored by portal auto-harvester engine 60 in a library such as a registry that can store multiple portlet components. In embodiments, the registry, e.g., storage system 22B, may include a user interface that allows developers of other applications to use the portlet components, stored in the repository, in those other applications that are being developed on other devices such as device 120. Thus, a developer using device 120 may retrieve portlet components from the repository to use in another web application. The developer can also test the functionality of the portlet prior to its use in a web application. Additionally, the developer can combine different portlets to create new functionalities within an application.

Figure 2:
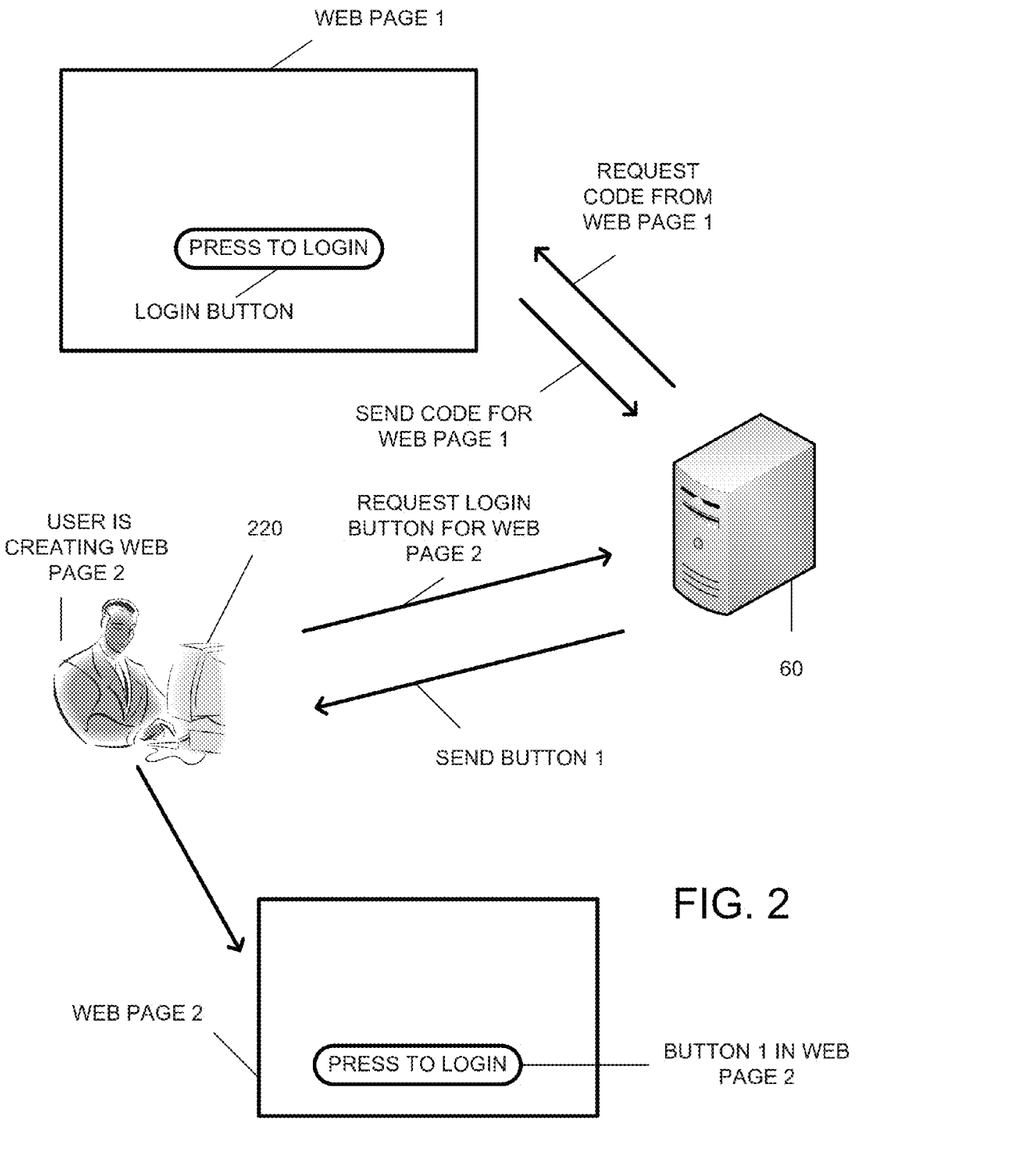
FIG. 2 shows an example process in accordance with aspects of the invention.

FIG. 2 shows an example process in accordance with aspects of the invention. For example, FIG. 2 shows web page 1, portal auto-harvester engine 60, computing device 220, and web page 2. While FIG. 2 shows web page 1, web page 2, portal auto-harvester engine 60, and computing device 220, the process may have a fewer or greater quantity of web pages, portal auto-harvester engines and/or computing devices.

As shown in FIG. 2, portal auto-harvester engine 60 may request or retrieve code from web page 1 (which has a login button or other mechanism). Upon receiving the request to retrieve code, web page 1 may send the code to portal auto-harvester 60. Upon receiving the code from web page 1, portal auto-harvester engine 60 determines which portions of the code have stand-alone functional components. Portal auto-harvester engine 60 then creates different functional components as described in FIG. 1.

Further, as shown in FIG. 2, a user is creating web page 2 with computing device 220. In creating web page 2, for example, the user can request and receive portlets from portal auto-harvester engine 60, e.g., functional component(s) already generated and stored by portal auto-harvester engine 60, in order to reduce time and costs associated with creating a functional component, such as a portlet, for web page 2. More specifically, as representatively shown in FIG. 2, computing device 220 can send a request to portal auto-harvester engine 60 for a portlet associated with a login function. In embodiments, portal auto-harvester engine 60 will receive the request and send button 1 to computing device 220, which was originally generated with web page 1. The button from web page 1 (the login button) can thus be incorporated into web page 2. Thus, in operation, functions used on one web page (i.e., web page 1) can be retrieved and then used in another web page (i.e., web page 2) without the need for the developer of web page 2 to recreate a portlet that already exists.

Figure 3:
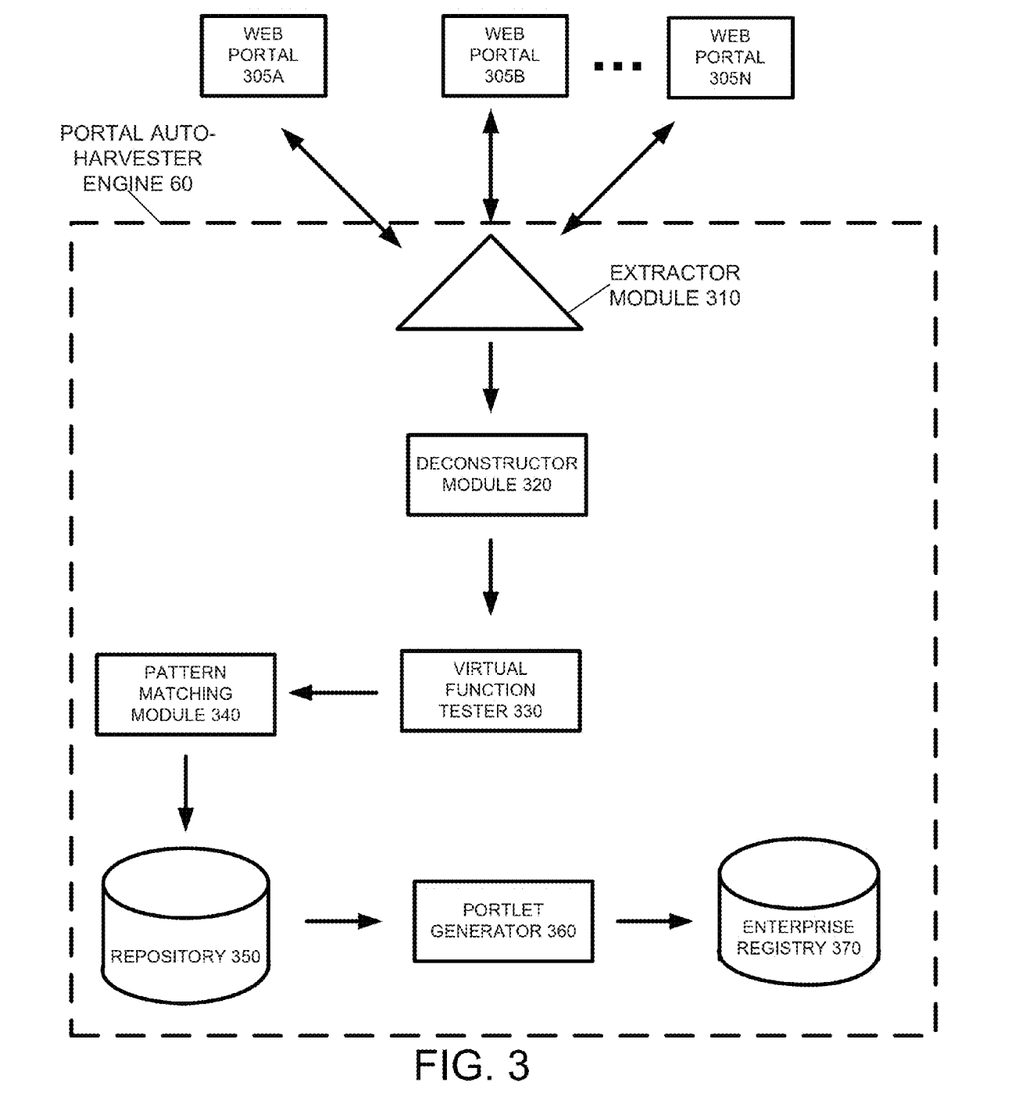
FIG. 3 shows a functional block diagram of an environment for extracting and consolidating portal code in accordance with aspects of the invention.

FIG. 3 shows a functional block diagram of an environment for extracting and consolidating portal code in accordance with aspects of the invention. More specifically, FIG. 3 shows a plurality of web portals 305A, 305B . . . 305(N), where N≥1 and portal auto-harvester engine 60. In embodiments, portal auto-harvester engine 60 includes the following components/modules: extractor module 310, deconstructor module 320, virtual function tester 330, pattern matching module 340, repository 350, portlet generator 360, and enterprise registry

370. In embodiments, extractor module 310, deconstructor module 320, virtual function tester 330, pattern matching module 340, repository 350, portlet generator 360, and/or enterprise registry 370 can be stored by the same device (e.g., auto-portal harvester 60) or can be stored by separate devices; and each can have a separate processors or a combined processor (general purpose or dedicated) as described with regard to FIG. 1.

Web portals 305A, 305B . . . 305(N), can include different types of information associated with a document that can be transmitted over the World Wide Web or any other communication mechanism (e.g., Intranet) and stored by a computing device. In embodiments, the different types of information can be textual and/or graphical representations of information. For example, the textual information can be web page headings or buttons with particular functions (e.g., login, link to other web pages, etc.). Further, for example, the graphical information may be pictures, photographs, tables, charts, graphs, images, and/or any other type of graphical information. The textual and graphical information can be implemented within web portals 305A, 305B . . . 305(N) using different languages, such as HTML, Javascript, etc. Any of the information in the web portals 305A, 305B . . . 305(N) can be information, e.g., portal code, that may be re-used by new or existing web applications having common functionality.

In embodiments, extractor module 310 can be an application stored and implemented by a computing device that extracts information from web portals 305A, 305B . . . 305(N). In embodiments, extractor module 310 may store a database structure that includes information about different web portals 305A, 305B . . . 305(N) which are retrieved by extractor module 310. After retrieval of information, extractor module 310 may store uniform resource locator (URL) information for different web portals 305A, 305B . . . 305(N). In embodiments, extractor module 310 can look up and retrieve particular web portals 305A, 305B . . . 305(N) after a particular period of time (e.g., every 10 seconds, every hour, etc.) and, accordingly, after the period of time, extractor module 310 may send a request for information from the particular web portals 305A, 305B . . . 305(N). In embodiments, the request for information (e.g., sending a ping, a communication request, etc.) may be a request for all the information stored by web portals 305A, 305B . . . 305(N) or a request for particular types of information associated with a particular type of language (e.g., HTML). As a result, web portals 305A, 305B . . . 305(N) can send the information, in embodiments, to extractor module 310.

Extractor module 310 sends the extracted information to deconstructor module 320. Deconstructor module 320 can be an application stored and implemented by a computing device that deconstructs information extracted from web portals 305A, 305B . . . 305(N) by extractor module 310. In embodiments, deconstructor module 320 can deconstruct code from web portals 305A, 305B . . . 305(N) into code fragments that are associated with different functions and/or different types of code, such as HTML, Javascript functions, meta-data, tags, etc. In embodiments, deconstructor module 320 matches UI function calls based on the different functions and/or code to a corresponding server-side component (e.g., login component).

Once the code is deconstructed into code fragments, deconstructor module 320 sends the code fragments to virtual function tester 330. Virtual function tester 330 can be an application stored and implemented by a computing device that tests functions by using different inputs/outputs to validate that the particular code fragment can function by itself.

In embodiments, virtual function tester 330 tests a string/function and provides a value. If the value satisfies a condition stored by virtual function tester 330, then this indicates that the particular code fragment can function by itself. Accordingly, virtual function tester 330 may communicate with deconstructor module 320 whether the code fragment can function by itself.

If the code fragment can function by itself, then virtual function tester 330 sends the code fragment to pattern matching module 340. Pattern matching module 340 can be an application stored and implemented by a computing device that is used to recognize common code patterns. In embodiments, common code patterns are associated with how keywords, tags, and/or metadata are arranged in the code fragment and how those patterns relate to other code patterns stored by pattern matching module 340. In embodiments, pattern matching module 340 determines, based on the code pattern, whether a code fragment is a common matched component, a transitioned component, or an unmatched component. In embodiments, a common matched component can be a code fragment that, based on a common key word and/or meta-data, is matched to a common server-side function stored by repository 350. In embodiments, a transitioned component can be a code fragment that is not matched to a common server side function but is matched to another function that is associated with a transitioned server-side function. The transitioned server-side function, stored by repository 350, may be a function that is similar to but is not exactly the same function associated with the code fragment. In embodiments, an unmatched component can be a code fragment that is not matched to any common server or transitioned server-side functions. As such, a user may manually find a function that matches the code fragment.

In embodiments, pattern matching module 340 can also determine whether the code fragment with the matched function is already associated with a portlet previously generated by pattern matching module 340. If there is a previously generated portlet, then pattern matching module 340 may determine not to generate a new portlet. With a function matched with a particular code fragment, repository 350 sends the code fragment associated with a function to pattern matching module 340.

Portlet generator 360 can be an application stored and implemented by a computing device that generates new portlet content. In embodiments, portlet generator 360 combines HTML and Javascript code fragments into a common predefined portlet (e.g., html/cascading style sheets (css)) skeleton to create new portlets. Each new portlet can be flagged as a common matched function, transitioned function, or as an unmatched function. As there is no previously generated portlet, portlet generator 360 integrates server-side software components and publishes (e.g., sends) the new portlets to enterprise registry 370. Enterprise registry 370 can be an application stored by a computing device that stores different portlets as common interfaces which can be re-used in other web portals 305.

Flow Diagram

Figure 4:
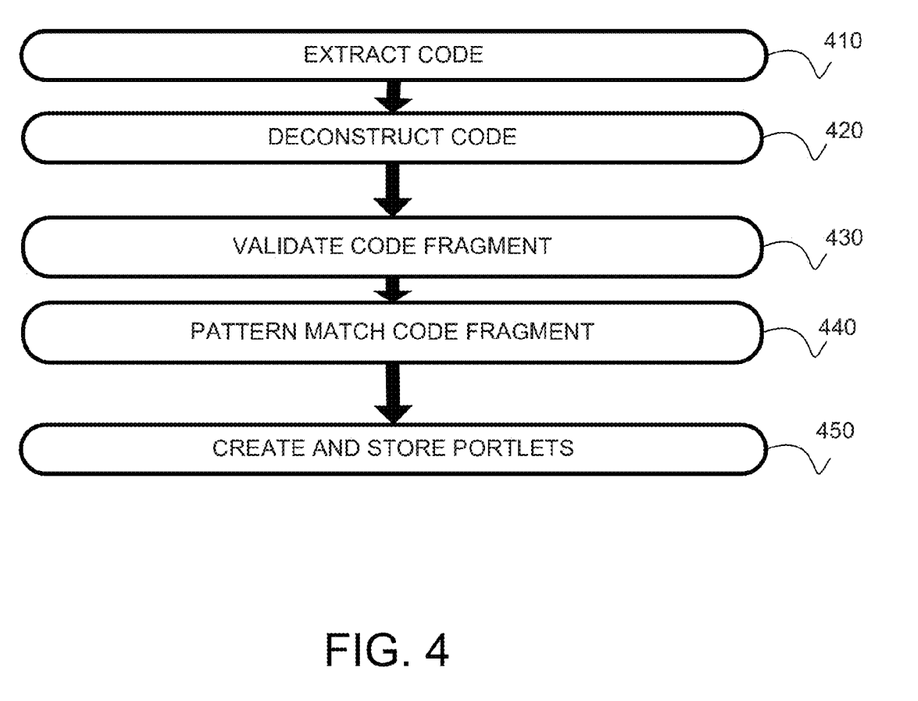
FIG. 4 shows an example flow in accordance with aspects of the invention.

FIG. 4 shows an exemplary flow for performing aspects of the present invention. The steps of FIG. 4 may be implemented in the environment of FIG. 1, for example and/or in the environments of FIGS. 2-3. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 4 depicts an exemplary flow for a process in accordance with aspects of the present invention. At step 410, a portal auto-harvester engine extracts code from a web application. In embodiments, the extracted code can be HTML, Javascript, and/or any other type of code. At step 420, the portal auto-harvester engine deconstructs the code. In embodiments, deconstruction includes splitting the code into code fragments which may have different functions and/or purposes within a web application. For example, one code fragment could be associated with a security function and another code fragment could be associated with an email function. At step 430, the portal auto-harvester engine validates the code fragment. In embodiments, the portal auto-harvester engine validates that a code fragment to determine that the code fragment can provide a function by itself. Once the code fragment is validated, the portal auto-harvester engine pattern matches the code fragment at step 440. In embodiments, pattern matching results in the code fragment being matched to a function. In further embodiments, the matching can be based on common matched components, transitioned components, or unmatched components. At step 450, the portal auto-harvester engine creates and stores portlets. In embodiments, the portal auto-harvester engine can combine HTML and Javascript code fragments into a common predefined portlet structure that can be used as a new portlet for use in other web applications. In further embodiments, the portlets are integrated with server-side software components and published (e.g. stored) by the portal auto-harvester engine to be used in other web applications.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    retrieving, by at least one computing device, code from an application;
    deconstructing, by the at least one computing device, the code into code fragments;
    validating, by the at least one computing device, each of the code fragments;
    matching, by the at least one computing device, each of the code fragments with server-side components; and
    generating, by the at least one computing device, a portlet based on the matching,
    wherein the matching of each of the code fragments with the server-side components comprises determining whether each of the code fragments is one of a common matched component, a transitioned matched component, and an unmatched component based on at least one of a common key word, a tag, and metadata, and
    wherein the matching of each of the code fragments with the server-side components further comprises determining whether each of the code fragments is one of:
    the common matched component when a code fragment is matched to a common server-side function in the server-side components based on at least one of the common key word, the tag, and the metadata;
    the transitioned matched component when the code fragment is not matched to the common server-side function and the code fragment is matched to a transitioned server-side function in the server-side components based on the at least one of the common key word, the tag, and the metadata; and
    an unmatched component when the code fragment is not matched to either the common server-side function or the transitioned server-side function in the server-side components based on the at least one of the common key word, the tag, and the metadata,
    wherein the transitioned server-side function is similar to the code fragment.

2. The method of claim 1, wherein the validating of each of the code fragments comprises determining whether each of the code fragments can function by itself.

3. The method of claim 1, wherein the retrieving of the code occurs automatically at predetermined times.

4. The method of claim 1, further comprising combining the portlet with another portlet to generate a different function.

5. The method of claim 1, wherein the retrieving occurs at a user interface (UI) layer by initiating a function call that requests the code from the application based on at least one of the tag, the common key word, and a function associated with the application, wherein the application is a web application.

6. The method of claim 1, further comprising:
    receiving a request for the portlet; and
    sending the portlet to another application, which is a web application.

7. The method of claim 1, wherein the generating the portlet includes combining hypertext markup language (HTML).

8. The method of claim 1, wherein the portlet is flagged as either common matched, transitioned matched, or unmatched.

9. The method of claim 1, wherein at least one of the code fragments is isolated and used to generate the portlet.

10. The method of claim 1, wherein the retrieving of the code is associated with a portion of a web application.

11. The method of claim 1, wherein the validating is done by using a string and receiving a value that indicates that at least one of the code fragments is valid.

12. A computer program product for generating portlets, the computer program product comprising a computer readable hardware storage device having program code stored on the computer readable hardware storage device, the program code comprising:
program code to receive code;
program code to deconstruct the code into code fragments;
program code to validate the code fragments to determine that the code fragments can function alone;
program code to match each of the code fragments with server-side components, wherein the matching includes analyzing at least one of: a common key word, a tag, and metadata; and
program code to generate a portlet based on the matching,
wherein the program code to match each of the code fragments with the server-side components comprises determining whether each of the code fragments is one of a common matched component, a transitioned matched component, and an unmatched component based on at least one of the common key word, the tag, and the metadata; and
wherein the program code to match each of the code fragments with the server-side components further comprises determining whether each of the code fragments is one of:
the common matched component when a code fragment is matched to a common server-side function in the server-side components based on at least one of the common key word, the tag, and the metadata;
the transitioned matched component when the code fragment is not matched to the common server-side function and the code fragment is matched to a transitioned server-side function in the server-side components based on the at least one of the common key word, the tag, and the metadata; and
an unmatched component when the code fragment is not matched to either the common server-side function or the transitioned server-side function in the server-side components based on the at least one of the common key word, the tag, and the metadata,
wherein the transitioned server-side function is similar to the code fragment.

13. The computer program product of claim 12, wherein:
the code is associated with a web application and a type of the code is at least one of: hypertext markup language (HTML) and extensible HTML (XHTML).

14. The computer program product of claim 12, further comprising discarding the code fragments that match the server-side functions associated with other portlets.

15. The computer program product of claim 12, further comprising testing the portlet before the portlet is used in a web application.

16. The computer program product of claim 12, wherein the validating includes inputting a dummy variable to determine that a code fragment outputs a correct value based on the dummy variable.

17. The computer program product of claim 12, further comprising receiving a request for the portlet, wherein the portlet is combined with another portlet and used in a web application.

18. The computer program product of claim 12, wherein the retrieving occurs at a user interface (UI) layer.

19. A system comprising:
one or more computer processors;
a computer readable hardware storage device;
program instructions stored on the computer readable hardware storage device for execution by the one or more computer processors, the program instructions comprising:
program instructions to retrieve code from a web application;
program instructions to deconstruct the code into code fragments, wherein each of the code fragments is associated with hypertext markup language (HTML);
program instructions to validate that each of the code fragments can function without requiring functionality of other code fragments;
program instructions to match each of the code fragments with server-side components, wherein the program instructions comprises determining whether each of the code fragments is one of a common matched component, a transitioned matched component, and an unmatched component based on at least one of a common key word, a tag, and metadata;
program instructions to discard the code fragments associated with stored portlets;
program instructions to store the code fragments that are not associated with the stored portlets; and
program instructions to generate a portlet and use the portlet in another web application,
wherein the program instructions to match each of the code fragments with the server-side components further comprises determining whether each of the code fragments is one of:
the common matched component when the code fragment is matched to a common server-side function in the server-side components based on at least one of the common keyword, the tag, and the metadata;
the transitioned matched component when the code fragment is not matched to the common server-side function and the code fragment is matched to a transitioned server-side function in the server-side components based on the at least one of the common key word, the tag, and the metadata; and
an unmatched component when the code fragment is not matched to either the common server-side function or the transitioned server-side function in the server-side components based on the at least one of the common key word, the tag, and the metadata,
wherein the transitioned server-side function is similar to the code fragment.

* * * * *